(No Model.)

G. K. BURLEIGH.
TRIP RECORDING CYCLOMETER OR MEASURING DEVICE.

No. 579,937. Patented Mar. 30, 1897.

Witnesses:
Walter E. Lombard.
Edward F. Allen.

Inventor:
George K. Burleigh,
by Crosby & Gregory.
Attys.

UNITED STATES PATENT OFFICE.

GEORGE K. BURLEIGH, OF NORTHFIELD, NEW HAMPSHIRE, ASSIGNOR TO THE TALLY DIAL CYCLOMETER COMPANY, OF NEWPORT, RHODE ISLAND.

TRIP-RECORDING CYCLOMETER OR MEASURING DEVICE.

SPECIFICATION forming part of Letters Patent No. 579,937, dated March 30, 1897.

Application filed March 23, 1896. Serial No. 584,360. (No model.)

*To all whom it may concern:*

Be it known that I, GEORGE K. BURLEIGH, of Northfield, county of Merrimac, and State of New Hampshire, have invented an Improvement in Trip-Recording Cyclometers or Measuring Devices, of which the following description, in connection with the accompanying drawings, is a specification, like letters and figures on the drawings representing like parts.

This invention has for its object the production of a cyclometer particularly adapted for the use of wheelmen, whereby not only a continuous register of the season's work is kept, but short trips can also be registered without interference.

Great numbers of wheelmen use cyclometers which keep a continuous register, and in order to ascertain the number of miles ridden in a single trip it is necessary to note down or memorize the last reading of the cyclometer before starting.

If a ride of a given distance is undertaken, the rider must make a calculation from time to time as to the number of miles yet to be traveled, taking up time and attention, and often wanting in accuracy on account of forgetfulness or errors in computation.

By my present invention the rider can see at a glance not only the season's record, but also the number of miles traversed on any particular trip, means being provided for setting the "trip-indicator" at the beginning of a run without in the least interfering with the general indicator.

Figure 1:
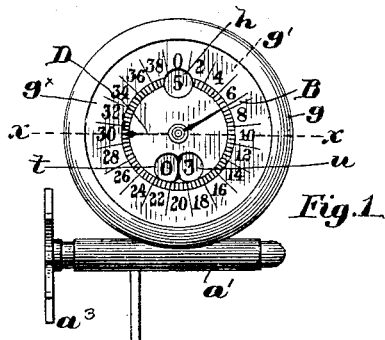
Figure 2:
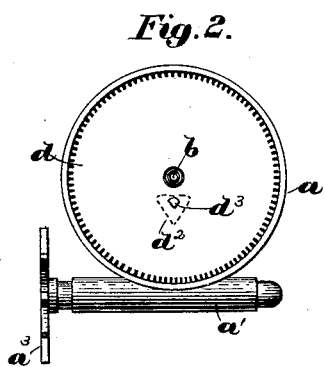
Figure 3:
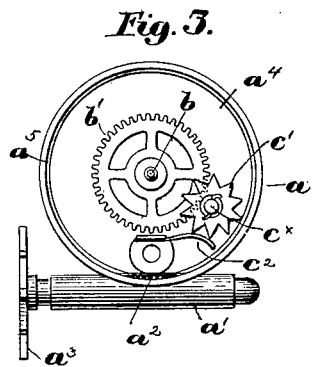
Figure 4:
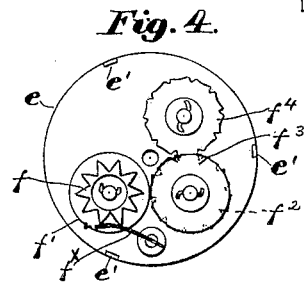
Figure 5:
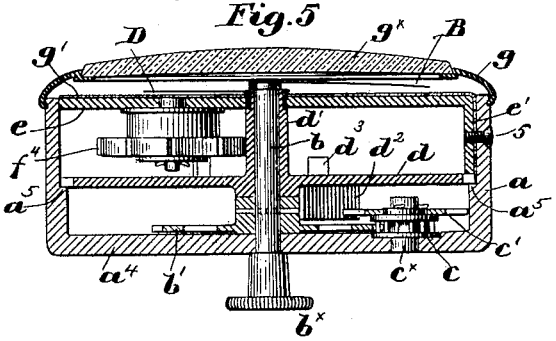

Figure 1 is a top or plan view of a cyclometer embodying my invention. Fig. 2 is a similar view with the dial removed. Fig. 3 is a plan view of the casing with the plate carrying the general registering mechanism removed. Fig. 4 is an under side view of said plate and mechanism; and Fig. 5 is an enlarged transverse sectional view of the cyclometer, taken on the line $x\,x$, Fig. 1.

The casing $a$, having a transverse external bearing $a'$ for the worm $a^2$, provided at one end with the star-wheel $a^3$, and the attaching-bracket $a^\times$ may be and are of usual and well-known construction in cyclometers. A spindle $b$, extended through the bottom $a^4$ of the casing (see Fig. 5) and provided at its lower end with a suitable thumb-nut $b^\times$, has secured thereto within the casing the hub of a gear $b'$, in mesh with a pinion $c$ on a stud $c^\times$, mounted in the casing-bottom. Secured to or forming a part of the pinion is a star-wheel $c'$, said wheel and pinion preferably having an equal number of teeth, a spring or other detent $c^2$ acting on the star-wheel (see Fig. 3) to prevent overrunning. A large disk-gear $d$, having an elongated hub $d'$, rests on the hub of gear $b'$ and rotates on the spindle $b$, the casing being also preferably annularly shouldered at $a^5$ to support the periphery of the disk $d$. This disk-gear is in mesh with the worm $a^2$, the latter passing through a portion of the casing-wall, as shown in Fig. 3, in usual manner, to be rotated step by step thereby, said disk having on its under side a lug $d^2$ to engage the star-wheel $c'$ at each revolution.

A disk $e$ is provided with ears $e'$, by which it is secured to the casing $a$ by screws 5, said disk carrying on its under side the counting mechanism, of usual construction, shown in Fig. 4 as a star-wheel $f$, rotatable with a single-tooth gear $f'$, which latter engages a notched gear $f^2$, (see dotted lines in Fig. 4,) the latter rotating with a single-tooth gear $f^3$, which in turn engages a notched gear $f^4$, the gears $f^2$ and $f^4$ being shown as of the Geneva-stop-motion class.

On the upper side of disk $d$ a lug $d^3$ engages the star-wheel $f$ at each revolution of the disk, which latter is arranged to make one complete revolution for each mile traveled, and a detent $f^\times$ controls the star-wheel $f$.

The sleeve $d'$ and spindle $b$ pass up through the plate $c$ and have secured thereto, respectively, hands or pointers D and B, which sweep over a dial formed on the upper side of the plate, as shown in Fig. 1, said dial being divided into forty equal spaces indicating eightieths of a mile for the hand D and miles up to forty for the hand B. As usual, the plate is apertured at $h$, $t$, and $u$, Fig. 1, to display the figures on the hundreds, tens, and units dials, secured, respectively, to the gears $f^4$, $f^2$, and $f'$.

It will be obvious that the general register mechanism will register mile after mile and fractions thereof throughout the season; but by turning the spindle $b$ by means of the nut $b^\times$ the hand B may be set at zero at any time, as at the beginning of a trip, without affecting in any way the general register mechanism. For each mile then traversed the hand B will move over one division of the dial, so that the rider can tell at a glance just how many miles have been traveled on the trip, the detent $c^2$ permitting reversal of the trip mechanism when setting to zero.

The bezel or ring $g$, carrying the protective glass $g^\times$, is attached to the casing $a$ in usual manner; and in order to still further exclude dust from the casing I cover the plate $e$ with a protector $g'$, of mica, celluloid, or other suitable transparent material, which also prevents the hands from entering the display-openings $h$, $t$, or $u$ if they should from any cause become bent.

In Fig. 1 the season-register stands at five hundred and three and three-fourths miles and the trip-register at seven and one-half miles, both records being discerned at a glance.

My invention is not restricted to the precise construction shown and described, for so far as I am aware it is broadly new to combine in a cyclometer with general registering mechanism a special or trip mechanism which may be set back to zero at any time.

While I have herein spoken of the measuring device as a cyclometer and particularly adapted for use on vehicles in measuring distances traversed, the instrument is not restricted to such use, as will be obvious, for if the actuating means be set in motion by any rotating object, such as a winding-drum, the length of the cloth, rope, or any material wound upon said drum will be measured. Not only this, but the continuous-measuring mechanism will foot up totals, while the short-distance or length measuring mechanism will measure the length of segregated portions of the material measured.

Having fully described my invention, what I claim, and desire to secure by Letters Patent, is—

1. In a measuring device or cyclometer having a dial, independent long and short distance measuring mechanisms, the latter including a spindle having a hand or pointer to coöperate with the dial, an intermittingly-rotated disk loosely mounted on the spindle between said mechanisms, a lug or projection on each side of said disk to engage and actuate said mechanisms respectively, and manually-operated means to rotate the spindle and thereby set the hand or pointer to the zero on the dial, substantially as described.

2. In a measuring device, a casing, a spindle rotatable therein and provided with a hand, a sleeve rotated on the spindle and also provided with a hand, an actuating-disk secured to the sleeve and having a lug on each of its sides, gearing connected with and to rotate the spindle, and actuated by one of said lugs, independent measuring mechanism actuated by the other lug, and means to manually rotate the spindle to set its hand to zero, substantially as described.

3. In a cyclometer, a casing, an apertured plate thereon having a dial on its outer face, a long-distance-measuring mechanism mounted on the under side of the plate, a spindle within the casing, and a hand or pointer on the spindle to coöperate with the dial, combined with an actuating-disk rotatable on the spindle and having a lug on each of its sides, connections between the spindle and one of the lugs, to rotate the spindle, and constituting with the latter an independent short-distance-measuring mechanism, means to rotate said disk intermittingly, and means to rotate the spindle manually to set the hand at zero, the other lug on the disk operating the long-distance-measuring mechanism, substantially as described.

4. In a cyclometer, a casing having an apertured dial, a toothed disk within said casing having a lug or projection on each of its sides, means to rotate the disk intermittingly, and long-distance-measuring mechanisms actuated by one of said lugs, combined with a spindle upon which the disk rotates, means to rotate the spindle manually, a hand and gear fast on said spindle, the former coöperating with the dial, and intermediate gearing between the disk and the spindle-gear, said intermediate gearing being actuated by the other lug on the said disk, substantially as described.

In testimony whereof I have signed my name to this specification in the presence of two subscribing witnesses.

GEORGE K. BURLEIGH.

Witnesses:
 FREDERICK W. FOWLER,
 WALTER C. WYATT.